(No Model.)
E. TAYLOR.
MACHINE FOR GRINDING BREAD OR CRACKERS.
No. 581,836. Patented May 4, 1897.
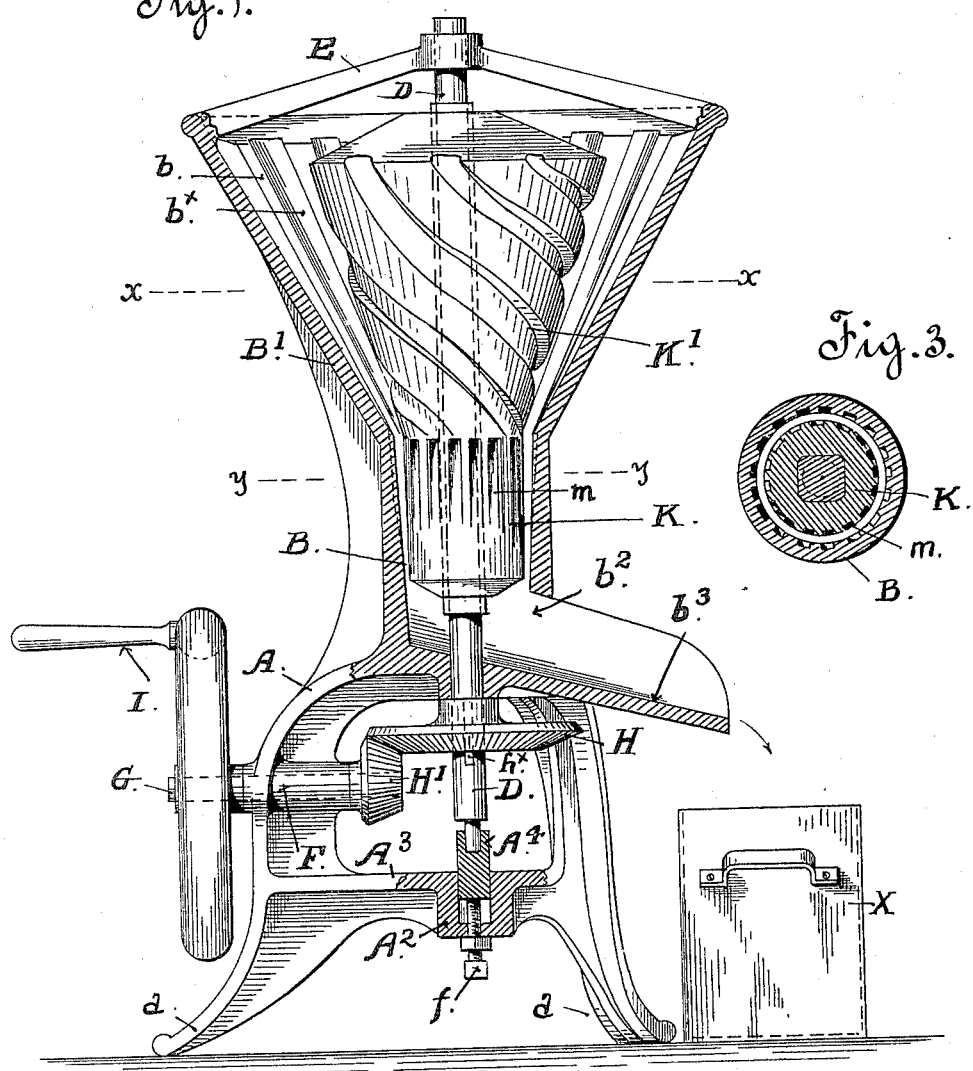
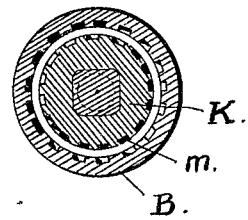
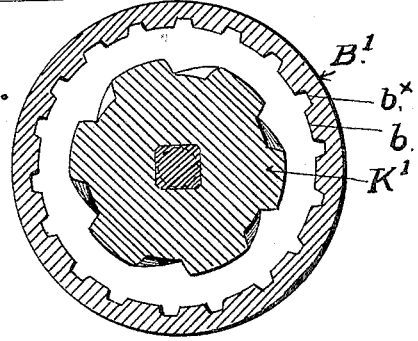
Witnesses.
Inventor.
Emma Taylor
by Smith & Osborn
her attys

United States Patent Office.

EMMA TAYLOR, OF SAN FRANCISCO, CALIFORNIA.

MACHINE FOR GRINDING BREAD OR CRACKERS.

SPECIFICATION forming part of Letters Patent No. 581,836, dated May 4, 1897.

Application filed June 30, 1896. Serial No. 597,632. (No model.)

*To all whom it may concern:*

Be it known that I, EMMA TAYLOR, spinster, a subject of the Queen of Great Britain, residing in the city and county of San Francisco and State of California, have invented an Improved Machine for Grinding Bread and Crackers for Culinary Purposes, of which the following is a specification.

This invention has for its object to provide for the use of cooks a machine for reducing stale bread or crackers to a granulated condition and to various and desired degrees of coarseness or sizes of granules, whereby the operations of the kind that are at the present time commonly performed by hand-labor, and more or less imperfectly, may now be done with considerable saving in time and strength on the part of the cook and also give a better quality of product.

The machine which I have produced for such purpose has features of adjustability to regulate the degrees of coarseness and fineness of the product and of being readily cleansed after use and being kept in a clean and sweet condition.

I attain and secure these ends and objects by the construction and combination of parts as hereinafter described and set forth, reference being had to the drawings that accompany and form part of this specification, in which—

Figure 1 is an elevation of my improved machine with the outer case or body in longitudinal section. Fig. 2 is a horizontal cross-section at the line $xx$, Fig. 1. Fig. 3 is a similar section at the line $yy$.

The body or stationary part of the machine is composed of a base A, a bowl or stationary body standing vertically upon said base and having a conical grinding-chamber with downwardly-tapering walls, which are formed of the lower conical portion B and the upper conical portion B' of different taper, having a common vertical axis, and an outlet in one side of the said lower part at the bottom provided with a spout. These parts are arranged to form a single-piece casting. The base A is cast open, with three legs $aaa$ and with a middle brace or center plate $A^3$ having a step or box $A^2$ to receive the foot of the upright spindle D, that carries and drives the moving part of the machine. At one side of this base a bearing F is provided for a horizontal driving-shaft G above the line of the center brace. Such horizontal shaft gives motion to the upright spindle and is connected to it by a miter-gear H on the spindle and a pinion H' on this shaft, the outer end of the shaft being provided with a hand-crank I for turning it.

The revolving grinding-surfaces of the machine are composed of a grinding-cone mounted to rotate on a vertical axis in the center of the stationary conical chamber. This part is constructed with a conical lower portion K and a conical upper portion K', corresponding in their general form and relation to each other with the narrow conical lower part B' and the wider conical part B of the surrounding conical chamber, so that the lower portion of smaller taper on the grinding-cone works in the lower conical part of the chamber and the conical upper part of the cone works in the funnel-shaped upper portion of the chamber. Such upper portion of the cone is given less degree of taper than the walls of the chamber, however, and the space between the two surfaces thus decreases rapidly from the top downward to the point where the conical portions of different taper join each other, and from that point downward the space between the revolving conical part and the surrounding conical surface decreases and in a gradual manner to the bottom of the grinder.

The surface of the conical upper portion of the grinder is grooved spirally from the top to the bottom of that part of the cone where it joins its lower conical part of less taper, these grooves being rectangular in cross-section, like the threads of a square-thread screw, and the surface of the conical lower portion is grooved longitudinally from the top part to a point about half-way down, the grooves $m$ decreasing in depth gradually downward and merging at their lower ends into the smooth surface of the lower conical part, so that this surface for about one-half the length is smooth or without grooves.

The walls of the surrounding conical chamber are formed with alternating ribs or projections $b$ and grooves $b^\times$, running longitudinally from top to bottom of the wider conical part B, with a regular decrease in width and depth and with proper convergence corresponding to the decrease in the diameter of the chamber in a downward direction. These grooves $b^\times$ extend into the lower conical portion B' for about one-half the length of that part and decrease in depth until they merge into the smooth surface of the lower portion that faces the smooth surface of the revolving cone.

A support for the upright spindle D is provided at the top in a bearing carried by a two-arm spider or bridge F, fixed in place across the open top of the stationary cone B and at the bottom in a block $A^4$, fitted into a box $A^2$, to be movable up and down and set on an adjusting-screw $f$, by means of which the block is adjusted vertically in the box to raise or lower the revolving cone in the stationary chamber. The gear H is fixed on the spindle D by a slot and feather $h^\times$, that the spindle may slide in the gear H to allow such adjustment.

By virtue of this construction and arrangement of parts the revolving cone is set up or down in the surrounding chamber and the stationary and the moving grinding-surfaces are set toward or away from each other accordingly to produce different degrees of coarseness or fineness of product. This adjustment is effected by turning the screw $f$ up or down, as will readily be understood.

In operating the machine when properly adjusted the stale bread or other like substance to be reduced is fed into the open funnel-shaped top of the bowl or casing in pieces about the size of a walnut at the same time that the crank is turned to drive the grinding-cone, and the reduced particles are discharged into a dish or receptacle X, placed under the spout $b$ to catch them.

With this machine stale bread, crackers, and other like material can be converted into a granular condition of uniform size of particles and of several different degrees of coarseness, according to the purpose for which the material is intended, such as for frying oysters or fish, or for making croquettes, or for puddings, and for concocting other dishes.

Having thus fully described my invention, what I claim as new therein, and desire to secure by Letters Patent, is—

A machine for grinding bread and crackers for culinary purposes, comprising in its construction a stationary body having a downwardly-tapering conical chamber with a flaring upper portion B and a contracted lower portion B', the surface of said flaring portion being grooved longitudinally all around its circumference and the surface of the said contracted lower portion being grooved longitudinally around its upper part and having the lower portion of its surface without grooves; a revolving grinding-cone mounted for rotation in said stationary chamber on a vertical shaft D and corresponding in shape with the surrounding chamber, and having the surface of its flaring upper portion K' grooved spirally from top to bottom with grooves gradually decreasing in width from top to bottom of the said flaring portion, and the surface of its tapering lower portion K grooved longitudinally from the top part way downward and the lower part of said surface without grooves; an outlet in the side of the stationary conical chamber having an inclined spout; a base supporting the stationary body having bearings for the vertical shaft, a horizontal, hand-operated, shaft geared into said upright shaft and provided with bearings on said base, and an adjustable step-bearing carrying the foot of the upright shaft and having means for setting the same up or down to change the position of the grinding-cone and thereby regulate the working relations of the revolving and stationary grinding-surfaces to each other, as set forth.

In testimony that I claim the foregoing I have hereunto set my hand and seal.

EMMA TAYLOR. [L. S.]

Witnesses:
 EDWARD E. OSBORN,
 M. REGNER.